3,355,009
Patented Nov. 28, 1967

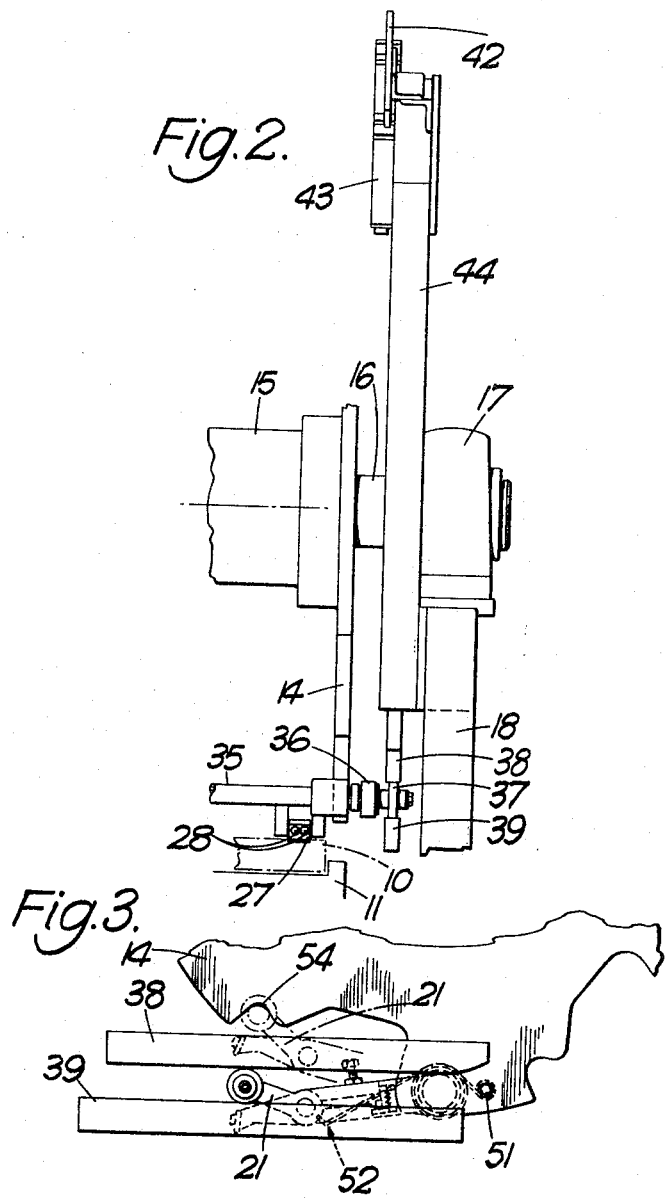

1

3,355,009
ARTICLE PROPELLING APPARATUS
George Harold Carter, Reigate, England, assignor to
Redland Tiles Limited, Reigate, England
Filed Feb. 10, 1966, Ser. No. 526,594
Claims priority, application Great Britain, Feb. 17, 1965,
6,918/65
12 Claims. (Cl. 198—221)

ABSTRACT OF THE DISCLOSURE

Pallets to be automatically filled with cement to form roofing tiles are propelled along a guideway by a rotary member carrying pivoted pawls, a nose of each of which pawls engages behind an article on each revolution. Guides engaged by the pawls determine the track followed by the pawl noses which are pivoted to the pawls and sprung into their operating position so that they move resiliently out of the way if the articles should jam. The pawl noses lead the pivot points of the pawls on the rotary member so that the articles are propelled along a length of guideway which diverges from the circular path of these pivot points.

---

Figure 1:
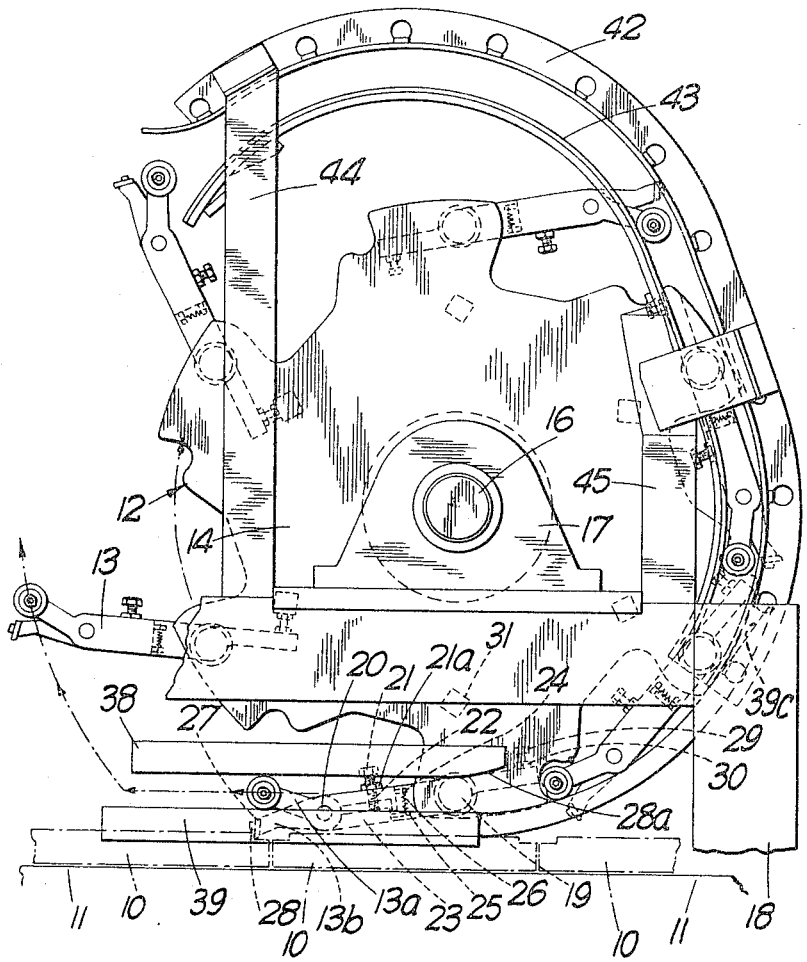

This invention relates to article propelling apparatus and as a particularly useful but not exclusive application in a machine for feeding pallets used in the manufacture of concrete roofing tiles from one station to another.

According to this invention there is provided article propelling apparatus comprising a guideway and means for propelling articles along the guideway which means comprises a rotary member mounted above the guideway for rotation about a horizontal axis, and a plurality of pawls mounted at circumferentially spaced locations on the member for limited rotational movement about respective axes parallel to said horizontal axis, such that, on rotation of the member the pawls are engageable with articles on the guideway to propel the articles along the guideway.

According to a preferred feature of the invention the apparatus further comprises guide means for guiding each pawl along the guideway as the pawl is carried along the lowest portion of its circular path by the rotary member.

According to another preferred feature of the invention the apparatus includes means for lifting each pawl out of engagement with an article on the guideway, which means is adjustable for controlling the position lengthwise of the guideway at which the pawl is disengaged. The adjustable lifting-out means may comprise a first abutment on the rotary member and a second abutment on the pawl one of which abutments is adjustable towards and away from the other. Alternatively, the adjustable lifting-out means may comprise hydraulic, pneumatic or electric actuators mounted on the rotary member and operative to lift out respective pawls, and means for adjustably controlling operation of each actuator.

In preferred constructions according to the invention each pawl is freely rotatable through its limited extent of rotational movement during at least part of the rotational movement of the rotary member. Alternatively, springs may be connected between the rotary member and the respective pawls, which springs bias the pawls into positions in which the pawls extend tangentially relative to the rotary member. In the arrangements in which the pawls are freely rotatable, second guide means is preferably provided extending peripherally of the rotary member for controlling the rotational position of each pawl about its axis during at least part of the movement of the pawl between disengagement from one of the articles and engagement with another of the articles. The second guide means may comprise a fixed member providing a slot extending peripherally of the rotary member, and each pawl has a portion extending into the slot, the two sides of the slot serving to control rotation of the pawl about its pivot axis on the rotary member.

According to still another preferred feature of the invention each pawl comprises a first portion pivotally connected to the rotary member, a second portion pivotally connected to the first portion about an axis which is offset lengthwise of the pawl from and parallel to the axis of rotation of the pawl on the rotary member, the first and second portions having respective abutment surfaces together defining a limiting position of relative rotation of the first and second portions, and a spring connected between the first and second portions and urging them into said limiting position. The position of one of said abutment surfaces may conveniently be adjustable to vary said limiting position.

One embodiment of the invention will now be described by way of example as applied in an apparatus for propelling tile pallets along a guideway. The description makes reference to the accompanying diagrammatic drawings in which:

FIGURE 1 shows a side view of the apparatus,
FIGURE 2 shows a half end view, some of the pawls having been omitted for the sake of simplicity, and
FIGURE 3 illustrates a modified pawl arrangement.

Referring first to FIGURES 1 and 2 of the drawings the pallets 10, providing moulds for moulding tiles from a wet concrete mixture are disposed on a guideway 11, and in this instance are pushed close together at the right-hand side of the propelling device (as it is shown in FIGURE 1) by a crowding conveyor of known type. As the pallets in turn move from the right under the propelling device 12, which rotates in a clockwise direction as viewed in FIGURE 1, the pallets are successively engaged by pairs of pawls 13 provided at spaced intervals round the propelling device. As each pallet 10 is propelled forward by a pair of pawls, the pallet comes into abutment with the preceding pallet and pushes the preceding pallet forward also. Thus each pallet propelled by the device 12 in turn propels forward in front of it a line of pallets.

The propelling device 12 comprises a rotary member formed from a pair of parallel coaxial discs 14 which are interconnected by a hub structure 15 and keyed to a horizontal driving shaft 16 and carry the pawls 13. The ends of the driving shaft are supported in bearing blocks 17 which are in turn mounted on a fixed base structure 18.

In the construction illustrated, six pairs of pawls 13 are spaced apart at equi-angular intervals round the periphery of the rotary member. The two pawls 13 of each pair are respectively rotatably mounted on the two discs 14 for rotation about a common axis indicated at 19 in FIGURE 1. Each pawl comprises two portions 13a, 13b which are pivotally connected together for relative rotation about an axis 20 parallel to the axis 19. An abutment screw 21 carrying a lock-nut 21a extends through a screwed hole 22 in the portion 13a and projects into abutment with the tail 23 of portion 13b. Portions 13a, 13b respectively carry posts 24, 25 to which the two ends of a tension spring 26 are respectively anchored, so that the portions 13a, 13b are pulled into relative positions such that the end of the shank of screw 21 abuts tail 23. Portion 13b carries at its forward end a nose piece 27 secured in position by screws 28. At its opposite end portion 13a extends beyond axis 19 and has screwed into it a stop screw 29 provided with a lock nut 30. An abutment block 31 is secured to the inner face of each disc 14 in a position such that as the pawl pivots about its axis 19, the head of stop screws 29 comes into engagement with abutment 31.

Portion 13a has an enlarged boss 34 at its forward end, and the aligned bosses 34 of the pair of pawls have secured in them an interconnecting shaft 35. The shaft extends laterally beyond the boss 34 and carries two follower wheels 36, 37.

A first fixed guide for the pawls is disposed at each side of the article guideway and comprises upper and lower members 38, 39 forming between them an open sided slot into which the follower wheel 37 enters just before the follower wheel reaches a position directly beneath the axis of the main shaft 16. The upstream end of member 38 is chamfered as indicated at 38a to provide a lead-in to the slot. Members 39 extend in an anticlockwise direction partway round the periphery of discs 14 and have at their opposite (leading) ends ramp portions 39a for the wheels 37.

A second fixed guide is formed on each side of the rotary member 12 and extends clockwise as shown from a location short of the top edge of the rotary member terminating at a location adjacent the ramp surface 39a of the fixed guide member 39. This second guide is formed by two fixed arcuate members 42, 43 which are secured through brackets to uprights 44, 45 on the fixed support structure 18. Members 42, 43 are disposed nearer the respective discs than guide members 38, 39 and are engaged by the follower wheels 30. The members are splayed apart at their leading ends to guide wheels 30 into the slot between the members.

The discs 14 are notched as shown to accommodate parts of the pawls 13 when the latter are rotated into their radially innermost positions relative to the axis of the main shaft 16.

In operation of the apparatus, device 12 is rotated in a clockwise direction as previously mentioned, and the nose pieces of the pawls 13 engage in recesses at the rear ends of successive pallets 10 and push the pallets forward along the guideway 11. Over this part of the rotational movement round the axis of shaft 16, the nose pieces of the pawls are guided along a rectilinear path by the guide members 38, 39. The pawls rotate relative to the discs 14 during this time, and as the follower wheels 31 emerge from the downstream ends of the slots between members 38, 39, the stop screws 29 engage the abutments 31 on the discs, so that the discs pull the pawls upward out of engagement with the pallet. The pawls 13 are held in this position relative to the discs 14 by gravity, until the pawls reach the leading end of the second fixed guide means formed by members 42, 43. The engagement of follower wheels 30 in the guide slot prevents the forward ends of the pawls from falling freely back against the discs 14, and gradually positions the follower wheels 31 for engagement with the ramp surfaces of the members 39.

The engagement of stop screw 29 against abutment 31 provides a positive lifting-out action to disengage the nose portion 27 of the pawls from the pallets 10, and screw 29 enables the point at which the nose portions are lifted out to be adjusted.

The spring and stop interconnection between the two portions 13a, 13b of the pawl enables the portion 13b to rotate about axis 20 relative to 13a so that nose piece 27 can ride over a pallet, if for any reason the pallet is not free, to prevent the apparatus from becoming jammed.

The disposition of the rotary member 12 above the guideway keeps the wheel, its driving mechanism and the pawls free from matter falling from the pallets or the guideway so that the apparatus does not become clogged. Furthermore the wheel can be of large dimensions without the necessity of raising the guideway unduly or of excavating to accommodate the wheels.

In a modified construction illustrated in the fragmentary FIGURE 3, in which corresponding parts are indicated by the same reference numerals, the second fixed guideway formed by members 42, 43 is dispensed with, and instead of the arrangement of stop screw 29 and abutment 31 for lifting the pawls out of engagement with the pallets, a spring is anchored at one end to the disc 14 by a bolt 51 and extends at its other end into a recess on the underside of the pawl portion 13a so as to bias the pawl resiliently in a clockwise direction about its axis 19. Thus when the follower wheel reaches the downstream end of the first fixed guide means 38, 39, spring 50 causes the pawl to be lifted out of engagement with the pallet and to be swung into a position in which the shaft 35 rests in a notch 54 in the periphery of the disc.

I claim:
1. Article propelling apparatus comprising a guideway, and means for propelling articles along the guideway including a rotary member having two parallel coaxial disc which are mounted above the guideway for rotation about a horizontal axis, a plurality of shafts which are mounted on the two discs in peripherally spaced relationship to each other and which extend parallel to the axis of rotation of the discs, a pair of pawls mounted on each shaft for rotation about the axis of the shaft relative to the discs, each pawl having a nose portion for engaging an article on the guideway, stop surfaces on the discs for limiting swinging movement of the pawls about their respective axes towards the axis of rotation of the rotary member, first fixed guide means at the sides of the guideway and projections on the pawls engaging the guide means to guide the pawls along the guideway as the pawls are carried along the lowest part of their circular path, abutments on the discs for lifting the pawls out of engagement with the articles on the guideway at the downstream end of the fixed guide means, adjustable stop screws on the respective pawls for engaging said abutments, second fixed guide means providing peripherally-extending slots at the sides of the rotary member for controlling the rotational positions of the pawls relative to the rotary member about their respective axes, the pawls having respective portions for engaging the slots, said pawls each comprising a first portion pivotally connected to the rotary member, a second portion pivotally connected to the first portion about an axis which is offset lengthwise of the pawl from and parallel to the axis of rotation of the pawl on the rotary member, the first and second portions having respective abutment surfaces together defining a limiting position of relative rotation of the first and second portions, one of which abutment surfaces is provided by an adjustable stop screw, and a spring connected between the first and second portions and urging them into said limiting position.

2. Article propelling apparatus comprising a guideway and means for propelling articles along the guideway, which means comprises a rotary member mounted above the guideway for rotation about a horizontal axis, and a plurality of pawls pivotally mounted at locations on the member spaced radially from the axis of rotation of the member and angularly from each other, means for limiting the pivotal movement of the pawls the axes of which are parallel to the said horizontal axis, the pawls being provided with an article engaging portion which lies, in the direction of movement of the pawl when the rotary member rotates, in advance of the pivotal mounting location of the pawl at least while the pawl is propelling an article, during which propelling action the pawl pivots about its pivotal mounting, whereby the article is positively driven, without substantial relative movement between the article and the said article engaging portion of the pawl, along a length of the guideway which diverges away from the path followed by the pivotal mounting locations of the pawls.

3. Article propelling apparatus as claimed in claim 2, wherein guide means are provided for guiding the article engaging portion of each pawl along the guideway as the pawl is carried along the lowest portion of its circular path by the rotary member.

4. Article propelling means as claimed in claim 3, wherein each pawl comprises a first portion which is pivotally mounted on the rotary member, a second portion carrying the said article engaging portion pivotally connected to the first portion about an axis which is offset lengthwise of the pawl from and parallel to the axis of rotation of the pawl on the rotary member, the first and second portions having respective abutment surfaces together defining a limiting position of relative rotation of the first and second portions, and a spring connected between the first and second portions urging them into the said limiting position.

5. Article propelling apparatus as claimed in claim 4, wherein the position of one of the said abutment surfaces is adjustable to vary the said limiting position.

6. Article propelling apparatus as claimed in claim 2, wherein lifting means are provided which lift the article engaging portion of each pawl to disengage the pawl from an article on the guideway, which lifting means is adjustable for controlling the position lengthwise of the guideway at which the said disengagement takes place.

7. Article propelling apparatus as claimed in claim 6, wherein the adjustable lifting means comprises a first abutment on the rotary member and a second abutment on the pawl, one of which abutments is adjustable towards and away from the other.

8. Article propelling apparatus as claimed in claim 6, wherein the adjustable lifting means comprises power-driven actuators mounted on the rotary member and operative to lift out the respective pawls, and means for adjustably controlling operation of each actuator.

9. Article propelling apparatus as claimed in claim 2, wherein each pawl is freely rotatable through its limited extent of rotational movement during at least part of the rotational movement of the rotary member.

10. Article propelling apparatus as claimed in claim 2, wherein springs are connected between the rotary member and the respective pawls, which springs bias the pawls into positions in which the pawls extend tangentially relative to the rotary member.

11. Article propelling apparatus as claimed in claim 2, wherein second guide means is provided extending peripherally of the rotary member, which second guide means is engaged by a portion on the pawl and controls the rotational position of each pawl about its axis during at least part of the movement of the pawl between disengagement from one of the articles and engagement with another of the articles.

12. Article propelling apparatus as claimed in claim 11, wherein said second guide means comprises a fixed member providing a slot extending peripherally of the rotary member, and the said portion of each pawl extends into the slot during the said part of the movement of the pawl, the two sides of the slot serving to control rotation of the pawl about its pivot axis on the rotary member.

References Cited

UNITED STATES PATENTS

| | | | |
|---|---|---|---|
| 2,183,664 | 12/1939 | Best | 198—25 |
| 2,919,801 | 1/1960 | Pechy | 198—209 X |

EDWARD A. SROKA, *Primary Examiner.*

EVON C. BLUNK, *Examiner.*

A. C. HODGSON, *Assistant Examiner.*